3,450,699
STABLE BROMINE ADDITION COMPOUNDS OF 2-PHENYL-2-OXAZOLINE AND 2-PHENYL-4H-5,6-DIHYDRO-1,3-OXAZINE
Wolfgang Seeliger and Ernst Aufderhaar, Marl, Germany, assignors to Chemische Werke Huls Aktiengesellschaft, Marl, Germany, a corporation of Germany
No Drawing. Filed Dec. 20, 1965, Ser. No. 515,238
Claims priority, application Germany, Apr. 24, 1965, C 35,683
Int. Cl. C07d 87/14, 85/36; A61l 13/00
U.S. Cl. 260—244    1 Claim

ABSTRACT OF THE DISCLOSURE

A mol of 2-aryl-oxazoline (or-hydrooxazine) is reacted with one to two gram atoms of bromine, at 0–80° C. to yield a stable bromine compound of the class of bromine complexes of organic bases. These complexes are useful as disinfectants and also as pesticides and as brominating agents.

---

It is known that aromatic heterocyclic bases such as pyridine can be reacted with bromine to the production of unstable adidtion compounds (see Djerassi, J. Am. Soc. 70 (1948) page 418 and especially left column, third paragraph and right column, fourth paragraph.

It is also known that stable addition compounds can be made by reacting bromine with salts of pyridine such as its hydrobromide. This however involves an additional operation (see Houben-Weyl, vol. V/4 (Brom- und Jodverbindungen) (1960) page 34 to second paragraph on page 35).

It has now been found that stable addition compounds containing active bromine can be made very simply by reacting from 1 to 2 gram atoms of bromine with 1 mol of 2-aryl-$\Delta^2$-oxazoline or 2-aryl-4H-5,6-dihydro-1,3-oxazine.

The reaction of these compounds with bromine is effected by bringing them together e.g. by adding the elemental bromine dropwise to the liquid and/or dissolved 2-aryl-oxazoline or hydrooxazine at a temperature within the range from 0 to 80° C., preferably from 10 to 70° C. The reaction can be carried out in the presence of a solvent.

Suitable solvents are those that are good solvents for the starting materials and which are inert to the bromo-2-aryl-$\Delta^2$-oxazoline or -hydrooxazine under the reaction conditions and which dissolve the same only sparingly. Examples are ether, benzene, carbon tetrachloride and other saturated aliphatic hydrocarbons containing from 2 to 16 carbon atoms and mixtures thereof.

By compounds containing active bromine we mean compounds that will liberate elemental iodine in a potassium iodide solution. The compounds of the present invention instantly liberate an amount of iodine equivalent to their bromine contents in very dilute neutral solutions of KI.

The process of the present invention gives addition products which differ both as to their physical properties and as to their stability. For example the action of bromine upon a stoichiometric equivalent amount of 2-phenyl-$\Delta^2$-oxazoline in the absence of solvent gives a finely crystalline yellow product having a melting point of about 40° C. which, after washing with carbon tetrachloride still has a very faint but durable smell of bromine (Example 1).

The production of an orange colored modification that is difficultly soluble in most solvents and melts at 85–87° C. and upon long storage does not exhibit a trace of bromine odor and which is especially suitable for use as a pesticide and disinfectant can be made by the transformation of the low melting point modifications or by slow crystallization (Examples 2 and 3). The formation of the high melting modification is favored by the use of inert solvents such as anhydrous diethylether and/or by the use of an excess of phenyloxazoline as well as by slow crystallization.

For the purpose of disinfection the bromo-2-aryl-$\Delta^2$-oxazoline or -hydrooxazine compound, preferably dissolved in a solvent that is miscible with water such as acetone is added in an extremely small amount with stirring to the water to be disinfected.

It was surprising that by the process of the invention crystalline and storage-stable bromine compounds containing active bromine generally can be produced. It was much more to be expected that the addition compounds of bromine and 2-aryl-$\Delta^2$-oxazolines would be unstable, that is, that rearrangement reactions would occur such as are known with respect to the hydrochlorides, hydrobromides and acetates of $\Delta^2$-oxazoline and the reaction products of $\Delta^2$-oxazolines with acid anhydrides and chlorides or that they would react with the substitution of hydrogen.

By the process of the present invention storage-stable and generally crystalline compounds containing active bromine are obtained in an extremely simple manner from the technically readily accessible 2-aryl-$\Delta^2$-oxazolines or hydrooxazines and bromine, said compounds having many possible uses and being convenient to handle.

The compounds produced in accordance with the invention are useful for example as pesticides or in highly diluted solutions as disinfectants e.g. in swimming pools. On the other hand the compounds are useful as brominating agents for a variety of organic materials such as olefines and phenols.

The 2-aryl-$\Delta^2$-oxazolines or hydrooxazines are compounds of the general formula

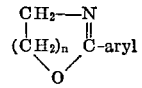

in which $n$ is 1 or 2, aryl stands for a member of the group consisting of phenyl-, o-, p- and m- toluyl-, p- and m-chlorophenyl-, $\alpha$- and $\beta$-naphthyl- and p- tert.-butylphenyl-. The methylene groups of the formula may be substituted by alkyl groups containing from 1 to 14 carbon atoms. 2-phenyl-$\Delta^2$-oxazoline is especially suitable.

The 2-aryl-$\Delta^2$-oxazolines or hydrooxazines are readily obtainable from 2-hydroxyethyl and 3 hydrooxypropyl carbon amides.

EXAMPLE 1

160 parts by weight of bromine were added dropwise to 147 parts by weight of 2-phenyl-$\Delta^2$-oxazoline with stirring and water-cooling to about 20–25° C. At the end of the addition of bromine a finely crystalline yellow mass precipitated having a melting point of about 40° C. The yield was quantitative. The bromine determination as described in Example 2 corresponds to the calculated value. After washing the product with carbon tetrachloride it had a faint smell of bromine. After recrystallization from dry acetone-petroleum ether mixture by dissolving at room temperature and then cooling to below 0° C. the product had a melting point of 58–60° C.

EXAMPLE 2

The product made as described in Example 1 was melted by heating to 40–50° C. and then stirred into an excess of 2-phenyl-$\Delta^2$-oxazoline. Crystallization took place immediately. The crystalline product was washed with dry ether or petroleum ether (boiling point 40–60° C.). The washed crystalline product was sucked dry and then dried in a vacuum desiccator over concentrated sulfuric acid. It amounted to 36.2 parts by weight and had no bromine odor even after long storage.

For determination of the bromine content of the product 1 g. thereof was accurately weighted and dissolved in 10 ml. of acetone and this solution added to a mixture of 30 ml. of a 10% solution of potassium iodide and 30 ml. of acetone. The brown iodine color appeared immediately. The color was intensified by the addition of 5 ml. of concentrated hydrochloric acid. The solution was titrated with n/10 sodium thiosulfate solution. The amount thereof used was 27 ml. which corresponds to a bromine content of 43.2%. The calculated bromine content was 52%.

EXAMPLE 3

32 parts by weight of bromine were added dropwise over a period of 15 minutes with stirring to a solution of 37 parts by weight of 2-phenyl-$\Delta^2$-oxazoline in 140 parts by weight of dry diethylether at room temperature with water cooling as necessary. The resulting mixture was then stirred for 3 hours at room temperature followed by 1 hour at reflux temperature. After standing for 2 days in a closed container an orange colored, coarsely crystalline deposit formed leaving the ether phase colorless. The deposit was sucked dry, washed with 40 parts by weight of diethylether and then dried. The yield was 60 parts by weight which equals 97% of the theoretical yield. The bromine determination as described in Example 2 gave a bromine content of 52% (calculated bromine content 52%). The product was stable and had no odor of bromine and there was no change in the melting point of 85–87° C. after prolonged storage.

EXAMPLE 4

The reaction of 161 parts by weight of 2-phenyl-4H-5,6-dihydro-1,3-oxazine with 160 parts by weight of bromine by the procedure described in Example 1 gave a quantitative yield of a yellow, liquid addition product. The determination of its bromine content by the procedure described in Example 2 gave the theoretical value of 49.8%.

We claim:
1. As a new product, a storage-stable bromine complex of an organic base selected from the group consisting of 2 - phenyl - $\Delta^2$-oxazoline and 2-phenyl-4H-5,6-dihydro-1,3-oxazine, said addition compound containing from 1 to 2 gram atoms of bromine per mol of said organic base.

References Cited

Chem. Abstracts, vol. 63, Abstract bridging cols. 18070–1, July–August, 1965.

ALEX MAZEL, *Primary Examiner.*

R. J. GALLAGHER, *Assistant Examiner.*

U.S. Cl. X.R.

260—307, 999